US010110389B2

(12) United States Patent
Hodges

(10) Patent No.: US 10,110,389 B2
(45) Date of Patent: Oct. 23, 2018

(54) METHODS, APPARATUSES AND COMPUTER PROGRAM PRODUCTS FOR FACILITATING TOLL FREE DATA ACCESS

(75) Inventor: Richard Lance Hodges, Tampa, FL (US)

(73) Assignee: SYNIVERSE TECHNOLOGIES, LLC, Tampa, FL (US)

( * ) Notice: Subject to any disclaimer, the term of this patent is extended or adjusted under 35 U.S.C. 154(b) by 316 days.

(21) Appl. No.: 13/360,312

(22) Filed: Jan. 27, 2012

(65) Prior Publication Data

US 2012/0209753 A1   Aug. 16, 2012

Related U.S. Application Data

(60) Provisional application No. 61/441,487, filed on Feb. 10, 2011, provisional application No. 61/479,618, filed on Apr. 27, 2011.

(51) Int. Cl.
*H04L 12/14* (2006.01)
*H04M 15/08* (2006.01)
(Continued)

(52) U.S. Cl.
CPC ........ *H04L 12/1475* (2013.01); *H04L 12/146* (2013.01); *H04M 15/08* (2013.01);
(Continued)

(58) Field of Classification Search
None
See application file for complete search history.

(56) References Cited

U.S. PATENT DOCUMENTS 6,839,684 B1    1/2005  Rissanen et al.

2002/0177431 A1   11/2002  Hamilton et al.
(Continued)

FOREIGN PATENT DOCUMENTS

CN     101795443 A    8/2010
EP     1296481 A1     3/2003
(Continued)

OTHER PUBLICATIONS

International Searching Authority, International Search Report and Written Opinion for International Application No. PCT/US2012/023430, dated Jul. 17, 2012, 10 pages, European Patent Office, The Netherlands.

(Continued)

*Primary Examiner* — Florian M Zeender
*Assistant Examiner* — Denisse Y Ortiz Roman
(74) *Attorney, Agent, or Firm* — Alston & Bird LLP

(57) ABSTRACT

An apparatus for facilitating toll free data access includes a processor and memory storing executable computer code causing the apparatus to at least perform operations including sending a request to a device requesting identification of one or more content providers that provide data to users in which the content providers pay for data, accessed from the content providers, on behalf of users. The accessed data is not considered data usage accrued by the users during a billing cycle or against a prepaid data plan. The computer program code may further cause the apparatus to receive an indication from the device of a content provider(s) that pays for the provision of the data on behalf of users. The computer program code may further cause the apparatus to determine whether a selected content provider pays for the provision of the data to users. Corresponding methods and computer program products are also provided.

30 Claims, 10 Drawing Sheets

(51) Int. Cl.
*H04M 15/00* (2006.01)
*H04W 4/24* (2018.01)
(52) U.S. Cl.
CPC ......... *H04M 15/51* (2013.01); *H04M 15/805* (2013.01); *H04M 15/8044* (2013.01); *H04W 4/24* (2013.01)

(56) References Cited

U.S. PATENT DOCUMENTS

| | | | |
|---|---|---|---|
| 2004/0125755 | A1 | 7/2004 | Roberts |
| 2008/0039049 | A1* | 2/2008 | Park ................... G06Q 20/1235 455/406 |
| 2010/0005525 | A1* | 1/2010 | Fischer ................... G06F 21/31 726/21 |
| 2010/0287048 | A1 | 11/2010 | Ramer et al. |
| 2012/0155380 | A1 | 6/2012 | Hodges |
| 2012/0270520 | A1 | 10/2012 | Zhou |
| 2012/0290584 | A1* | 11/2012 | De Bona ................... G06F 8/60 707/741 |

FOREIGN PATENT DOCUMENTS

| | | | | |
|---|---|---|---|---|
| WO | WO 2001/091003 | A2 | 11/2001 | |
| WO | WO 2005/003993 | A1 | 1/2005 | |
| WO | WO 2006/129923 | * | 5/2006 | ............... H04Q 7/38 |
| WO | WO2006/129923 | * | 5/2006 | ............... H04Q 7/38 |
| WO | WO 2006/129923 | A1 | 12/2006 | |

OTHER PUBLICATIONS

Sid Murlidhar, Fast and Fee Facebook Mobile Access with 0.facebook.com, May 18, 2010, 3 pages total, 0.facebook.com.
Tutorials Point, GPRS—Access Modes & Access Point Names, Retrieved Aug. 23, 2010 from Internet Site http://www.tutorialspoint.com/gprs/gprs_access_modes.htm, 2 pages total, Tutorials Point.
Tutorials Point, GPRS Architecture, Retrieved Aug. 23, 2010 from Internet Site http://www.tutorialspoint.com/gprs/gprs_architecture.htm, 2 pages total, Tutorials Point.
Tutorials Point, GPRS Protocol Stack, Retrieved Aug. 23, 2010 from Internet Site http://www.tutorialspoint.com/gprs/gprs_protocol_stack.htm, 1 page total, Tutorials Point.
Tutorials Point, GPRS—Data Routing, Retrieved Aug. 23, 2010 from Internet Site http://www.tutorialspoint.com/gprs/gprs_data_routing.htm, 2 pages total, Tutorials Point.
Point Tutorials Point, GPRS—PDP Context, Retrieved Aug. 23, 2010 from Internet Site http://www.tutorialspoint.com/gprs/gprs_pdp_context.htm, 2 pages total, Tutorials Point.
Wikipedia, GPRS Core Network, Retrieved Dec. 2, 2010 from Internet Site http://en.wikipedia.org/wiki/GPRS_Core_Network, 6 pages total, Wikipedia.
Wikipedia, Radius, Retrieved Aug. 9, 2010 from Internet Site http://en.wikipedia.org/wiki/RADIUS, 12 pages total, Wikipedia.
Calhoun et al., Diameter Base Protocol, Retrieved Oct. 1, 2010 from Internet Site http://www.apps.ietf.org/rfc/rfc3588.html, 26 pages total, Network Working Group.
Wikipedia, Diameter (protocol), Retrieved Oct. 1, 2010 from Internet Site http://en.wikipedia.org/wiki/Diameter_(protocol), 9 pages total, Wikipedia.
Digi, Digi Connect® Application Guide Cellular IP Connections (Uncovered), Jul. 18, 2005, 7 pages total, Digi International.
Mblox, Sender-Pays Data, mBlox Sender-Pays Data-Zero Data Charge for Consumers, Retrieved Jan. 3, 2011 from Internet Site http://www.mblox.com/products/sender-pays-data/, 3 pages total, mBlox.
Mblox, mBlox Sender-Pays Data, Zero Data Charge for the Consumer, Date Unknown, 2 pages total, Mblox.
Mblox, Sender Pays Data Interface, 2010, Version 1.0, 7 pages total, Mblox.
United States Patent and Trademark Office, Office Action for U.S. Appl. No. 12/970,152, dated Mar. 26, 2013, 16 pages, USA.
International Searching Authority, International Search Report and Written Opinion for International Application No. PCT/US2011/054672, dated Mar. 19, 2014, 15 pages, European Patent Office, The Netherlands.
Qualcomm Incorporated, et al., "Change Request 29.212 CR 0511, Revision 3, Version 10.0.0, Additions to Support Sponsored Connectivity", In the proceedings of 3GPP TSG-CT WG3 Meeting #60, C3-101384 (Revision of C3-101120, C3-101428, and C3-101378), Nov. 19, 2010, Jacksonville, USA (XP050481890).
United States Patent and Trademark Office, Office Action for U.S. Appl. No. 14/147,172, dated May 23, 2014, 8 pages, USA.

* cited by examiner

METHODS, APPARATUSES AND COMPUTER PROGRAM PRODUCTS FOR FACILITATING TOLL FREE DATA ACCESS

CROSS-REFERENCE TO RELATED APPLICATIONS

This application claims benefit of U.S. Provisional Application No. 61/441,487 filed Feb. 10, 2011 and U.S. Provisional Application No. 61/479,618 filed Apr. 27, 2011, both of which are hereby incorporated herein in their entirety by reference.

TECHNOLOGICAL FIELD

An example embodiment of the present invention relates generally to wireless communications and more particularly, relates to a method, apparatus and computer program product for facilitating toll free data access.

BACKGROUND

Currently, users of smart communication devices typically pay for the data access they use via a communications network. In some instances the data access usage may be expensive. In other instances, a user may reach their data usage limit but may still desire to access data via the network.

As such, it may be beneficial to provide a mechanism for providing free data access to communication devices.

BRIEF SUMMARY

A method, apparatus and computer program product are therefore provided for facilitating toll free data ("TFD") access to mobile users in a wireless environment. In an example embodiment, this service ("TFD service") may provide toll free (e.g., at no charge to the user) access to data. An example embodiment may involve a user with a smart phone accessing a mobile web site and transferring data from the content provider that is displayed using the mobile phone's browser. By providing toll free data access, a wireless service provider can encourage certain users to access certain web sites.

The present invention generally involves procedures and processing for informing a mobile user of the charging status associated with accessing a data provider over a wireless network. In one embodiment, a mobile station ("MS") is provided information regarding the charging status for TFD destinations; the MS then informs the user prior to accessing the destination of the charging status of the toll free data (e.g., whether it is a sponsored or non-sponsored site). The MS can request, using a mobile application, information on TFD destinations. The information is provided to the MS, which can then locally process this information to inform the user in a variety of ways.

In other embodiments, the user can be informed about the charging status by receiving subsequent information from the content provider themselves. In another embodiment, the mobile network service provider can inform the user of the status.

In various embodiments, the user may be prompted to enter an authorization code or otherwise confirm that the user desires to proceed in accessing the content provider. Typically, this capability is invoked when the user is accessing a non-sponsored content provider.

In one example embodiment, a method for facilitating toll free data access is provided. The method includes sending a request to a device requesting identification of one or more content providers that provide data to users in which the content providers pay for data, accessed from the content providers on behalf of users. The accessed data is not considered data usage accrued by the users during a billing cycle or against a prepaid data plan. The method may further include receiving an indication from the device of at least one content provider that pays for the provision of the data on behalf of users. The method may further include determining whether a selected content provider pays for the provision of the data to the users.

In another example embodiment, an apparatus for facilitating toll free data access is provided. The apparatus may include at least one processor and at least one memory including computer program code. The memory and the computer program code are configured to, with the processor, cause the apparatus to at least perform operations including sending a request to a device requesting identification of one or more content providers that provide data to users in which the content providers pay for data, accessed from the content providers on behalf of users. The accessed data is not considered data usage accrued by the users during a billing cycle or against a prepaid data plan. The memory and the computer program code are further configured to, with the processor, cause the apparatus to receive an indication from the device of at least one content provider that pays for the provision of the data on behalf of users. The memory and the computer program code are further configured to, with the processor, cause the apparatus to determine whether a selected content provider pays for the provision of the data to users.

In another example embodiment, a computer program product for facilitating toll free data access is provided. The computer program product includes at least one computer-readable storage medium having computer executable program code instructions stored therein. The computer executable program code instructions may include program code instructions configured to facilitate sending of a request to a device requesting identification of one or more content providers that provide data to users in which the content providers pay for data, accessed from the content providers, on behalf of users. The accessed data is not considered data usage accrued by the users during a billing cycle or against a prepaid data plan. The program code instructions may also be configured to cause receipt of an indication from the device of at least one content provider that pays for the provision of the data on behalf of users. The program code instructions may also be configured to determine whether a selected content provider pays for the provision of the data to the users.

DETAILED DESCRIPTION

Figure 1:
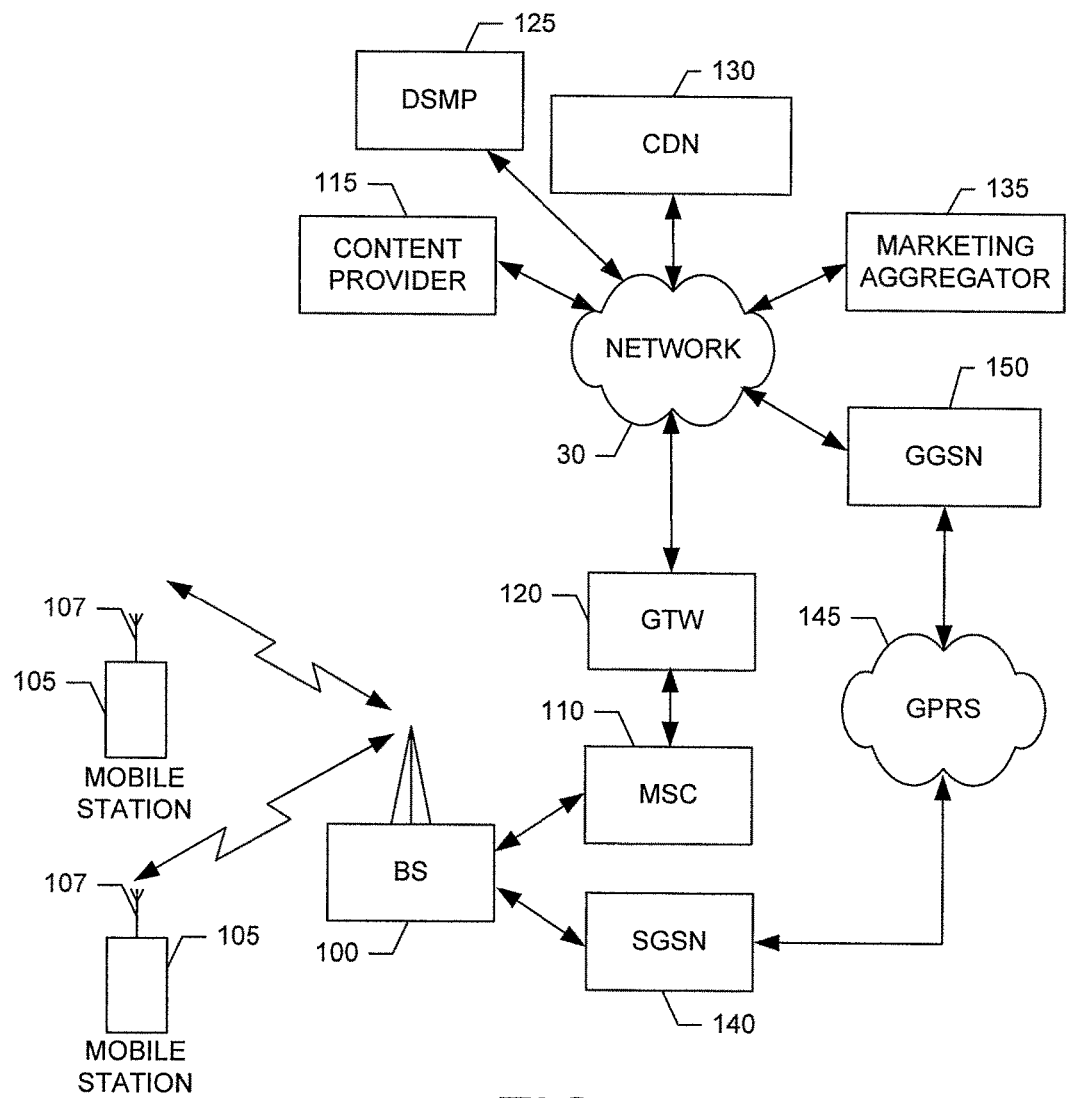
FIG. 1 is a schematic block diagram of a system according to an example embodiment of the invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a sponsor(s) (also referred to herein interchangeably as a content provider(s)) may denote a third party providing content in which the third party pays for providing of data (e.g., a download of data, etc.) to one or more subscribers or devices (e.g., mobile subscribers).

Exemplary System Architecture

Referring now to FIG. 1, an illustration of a communication system that can be used in conjunction with various example embodiments of the invention is provided. The system includes a plurality of network devices. As shown, one or more mobile stations 105 may each include an antenna 107 for transmitting signals to and for receiving signals from a base site or base station (BS) 100. The base station 100 may be a part of one or more cellular or mobile networks each of which includes elements required to operate the network, such as a mobile switching center (MSC) 110. In operation, the MSC 110 is capable of routing calls to and from the mobile stations 105 when the mobile stations 105 are making and receiving calls. The MSC 110 may also provide a connection to landline trunks when a mobile station(s) 105 is involved in a call. In addition, the MSC 110 is configured to control the forwarding of messages to and from the mobile stations 105, and can also control the forwarding of messages for the mobile stations 105 to and from a messaging center.

The MSC 110 may be coupled to a data network, such as a local area network (LAN), a metropolitan area network (MAN), and/or a wide area network (WAN). The MSC 110 can be directly coupled to the data network. In one example embodiment, however, the MSC 110 may be coupled to a gateway (GTW) 120, and the GTW 120 is coupled to a WAN, such as the network 30 (e.g., the Internet). In turn, devices such as processing elements (e.g., personal computers, server computers or the like) can be coupled to the mobile stations 105 via the network 30 (e.g., the Internet). For example, as explained below, the processing elements can include one or more processing elements associated with a content provider 115 (one shown in FIG. 1), a Data Session Management Platform (DSMP) 125 (one shown in FIG. 1), a content distribution network (CDN) 130 (also referred to herein as content delivery network), a marketing aggregator device 135, or the like, as described below.

The BS 100 may also be coupled to a Serving General Packet Radio Service (GPRS) Support Node (SGSN) 140. The SGSN 140 is capable of performing functions similar to the MSC 110 for packet switched services. The SGSN 140, like the MSC 110, can be coupled to a data network 30, such as, for example, the Internet, or private network (e.g., a GPRS roaming exchange (GRX), an Internetwork Packet Exchange (IPX), a CDMA (Code Division Multiple Access) Packet Data Roaming Exchange (CRX), etc.). The network 30 may be used between mobile operators for data roaming as well as for any other suitable communications. The SGSN 140 can be directly coupled to the data network. In an example embodiment, however, the SGSN 140 is coupled to a packet-switched core network, such as a GPRS core network 145 (also referred to herein as GPRS system 145). The packet-switched core network is then coupled to another gateway, such as a GTW GPRS support node (GGSN) 150, and the GGSN 150 is coupled to the network 30 (e.g., the Internet). In addition to the GGSN 150, the packet-switched core network may also be coupled to a GTW 120.

In addition, by coupling the SGSN 140 to the GPRS core network 145 and the GGSN 150, devices such as a content provider 115, DSMP 125, CDN 130, and/or marketing aggregator device 135 may be coupled to the mobile stations 105 via the network 30. In this regard, devices such as the content provider 115, the DSMP 125, the CDN 130, and/or marketing aggregator device 135 may communicate with each other and/or with the mobile stations 105 across the SGSN 140, GPRS core network 145, the GGSN 150 and the network 30. By directly or indirectly connecting mobile stations 105 and the other devices (e.g., content provider 115, DSMP 125, CDN 130, marketing aggregator device 135, etc.) to the network 30, the mobile stations 105 may communicate with the other devices and with one another, such as according to the Hypertext Transfer Protocol (HTTP), to thereby carry out various functions of the mobile stations 105.

Exemplary Data Session Management Platform

Figure 2:
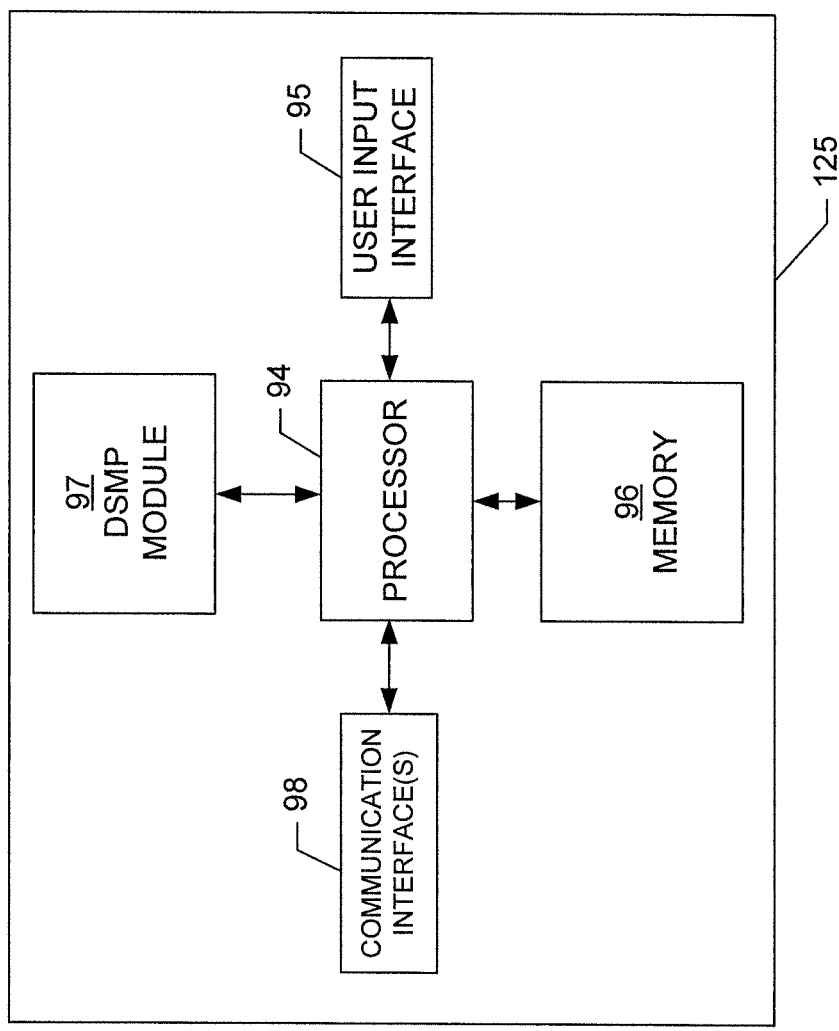
FIG. 2 is a schematic block diagram of a network device according to an example embodiment of the invention.

Referring now to FIG. 2, a block diagram of one example of a Data Session Management Platform (DSMP) is provided. As shown in FIG. 2, the DSMP 125 (also referred to herein as DSMP device 125) (e.g., a server) generally includes a processor 94 and an associated memory 96. The memory 96 may comprise volatile and/or non-volatile memory, and may store content, data and/or the like. For example, the memory may store content, data, information, and/or the like transmitted from, and/or received by, the DSMP. Also for example, the memory 96 may store client applications, instructions, and/or the like for the processor 94 to perform the various operations of the DSMP 125 in accordance with an embodiment of the invention, as described herein.

Additionally, as such, whether configured by hardware or software methods, or by a combination thereof, the processor 94 may comprise an entity capable of performing operations according to embodiments of the present invention while configured accordingly. Thus, for example, when the processor 94 is embodied as an ASIC, FPGA or the like, the processor 94 may comprise specifically configured hardware for conducting one or more operations described herein. Alternatively, as another example, when the processor 94 is embodied as an executor of instructions, such as may be stored in the memory 96, the instructions may specifically configure the processor 94 to perform one or more algorithms and operations described herein.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the DSMP to receive data from a user, such as a keypad, a touch display, a joystick, a microphone and a speaker or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the DSMP module 97. The DSMP module 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the DSMP module 97, as described below. Thus, in an example in which software is employed, a device or circuitry (e.g., the processor 94 in one example) executing the software forms the structure associated with such means. The DSMP 125 may receive a request from a mobile station 105 for TFD Site Information and may provide the mobile station 105 with the TFD Site Information to enable the mobile station 105 to access a destination on a toll free basis, as described more fully below.

Exemplary Mobile Station

Figure 3:
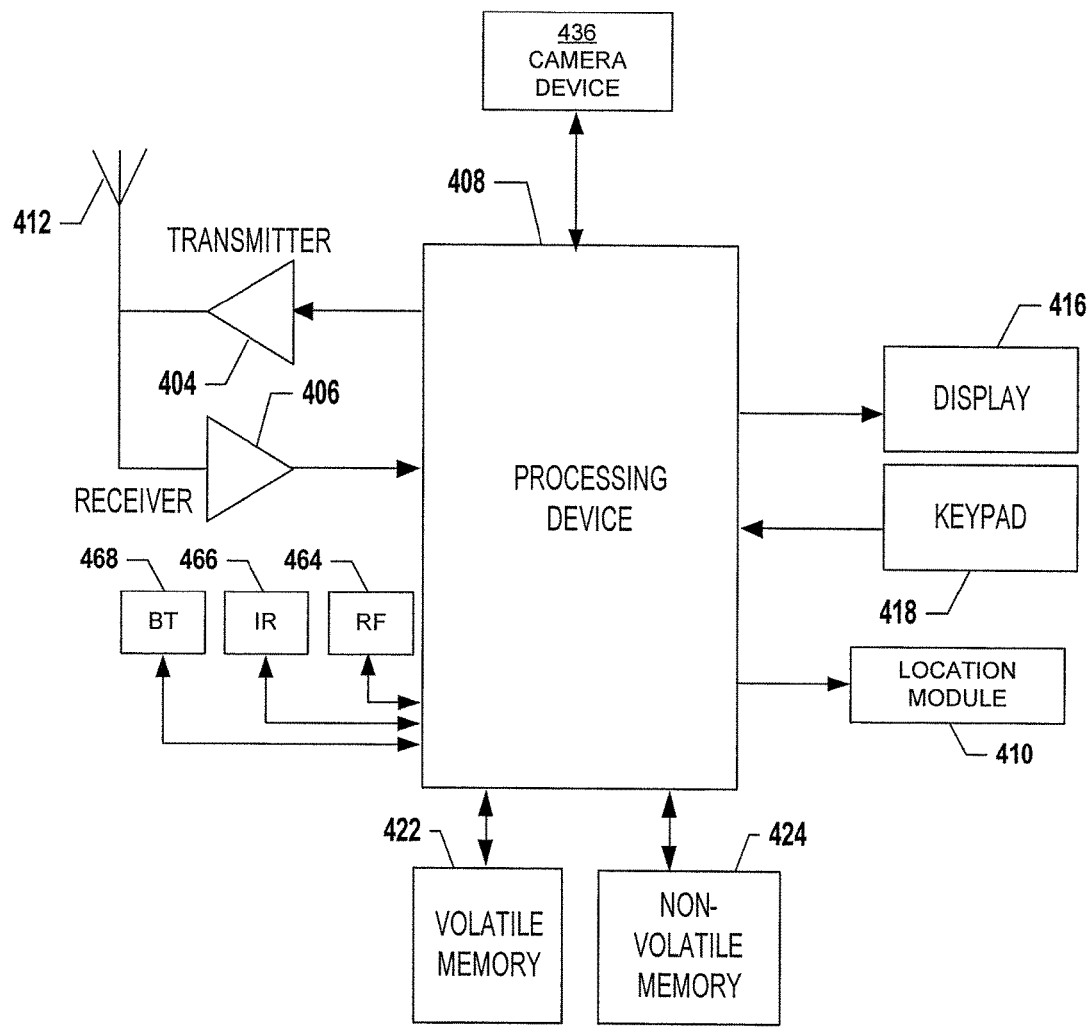
FIG. 3 is a schematic block diagram of a mobile station according to an example embodiment of the invention.

FIG. 3 provides an illustrative schematic representative of a mobile station 105 that may be used in conjunction with the example embodiments of the invention. As shown in FIG. 3, the mobile station 105 (also referred to herein as MS 105) may include an antenna 412, a transmitter 404, a receiver 406, and a processing device 408 (e.g., a processor, controller, and/or the like) that provides signals to and receives signals from the transmitter 404 and receiver 406, respectively.

The signals provided to and received from the transmitter 404 and the receiver 406, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of second-generation ("2G") communication protocols, third-generation ("3G") communication protocols, fourth-generation ("4G"), Global System for Mobile Communications ("GSM"), Universal Mobile Telecommunications System ("UMTS"), Long Term Evolution ("LTE"), LTE-Advanced ("LTE-A") GPRS, W-CDMA, CDMA communication protocols, and/or the like. Further, for example, the mobile station 105 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the mobile station 105 may communicate with various other entities using concepts such as Unstructured Supplementary Service Data ("USSD"), Short Message Service ("SMS"), Dual-Tone Multi-Frequency Signaling ("DTMF"), and/or Subscriber Identity Module Dialer ("SIM dialer"). The mobile station 105 can also download changes, add-ons, and updates, for instance, to its firmware, software (e.g., including modules), and operating system.

The mobile station 105 may also comprise an optional user interface (that can include a display 416 coupled to a processing device 408) and/or a user input interface (coupled to the processing device 408). The user input interface can comprise any of a number of devices allowing the mobile station 105 to receive data, such as a keypad 418, a touch display, voice or motion interfaces, or other input device. In embodiments including a keypad 418, the keypad 418 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 may further include a location module 410 in communication with the processing device 408. The location module 410 may be any device or means for locating the position of the mobile station 105. The location module 410 may include all hardware for locating the position of a mobile station 105. Alternatively or additionally, the location module 410 may utilize a memory (e.g., volatile memory 422, non-volatile memory 424) of the mobile station 105 to store instructions for execution by the processing device 408 in the form of software necessary to determine the position or location of the mobile station 105. Additionally, the location module 410 is capable of utilizing the processing device 408 to transmit/receive, via the transmitter 404/receiver 406, locational information (e.g., one or more geo-location codes (e.g., an identifier indicating a geographic location of an object (e.g., mobile station 105)) such as the position of the mobile station 105, to a network device (e.g., a server), such as, for example, the DSMP 125, as described more fully below.

The mobile station 105 may also include a Near Field Communications (NFC) transceiver (also referred to herein as short range radio frequency (RF) transceiver) and/or interrogator 464 so data may be shared with and/or obtained from electronic devices (e.g., a RF access point(s)) in accordance with RF techniques. The mobile station 105 may also include other transceivers such as, for example, an infrared (IR) transceiver 466, a Bluetooth (BT) transceiver 468 operating using Bluetooth brand wireless technology developed by the Bluetooth Special Interest Group, and/or the like. In this regard, the mobile station 105 and, in particular, the Near Field Communications transceiver may be capable of transmitting data to and/or receiving data from electronic devices (e.g., a tag (e.g., a Radio-Frequency Identification (RFID) tag), an IR access point(s), a BT access point(s), etc.) within a proximity of the mobile station 105, such as within 10 meters, for example.

The mobile station 105 may also include a camera device 436. The camera device 436 may include a camera, video and/or audio module, in communication with the processing device 408 and the display 416. The camera device 436 may be any means for capturing an image, video and/or audio for storage, display or transmission. For example, the camera device 436 may include a digital camera configured to form a digital image file from a captured image. As such, the camera device 36 may include all hardware, such as a lens or other optical component(s), and software necessary for creating a digital image file from a captured image. In an alternative example embodiment, the camera device 436 may include only the hardware needed to view an image, while a memory device (e.g., volatile memory 422 and/or non-volatile memory 424) of the mobile station 105 stores instructions for execution by the processing device 408 in the form of software necessary to create a digital image file from a captured image. In addition, the camera device 436 may be configured to capture an image, scan, read or detect one dimensional (1D) bar codes, two dimensional (2D) bar codes, three dimensional (3D) bar codes, Quick Response (QR) codes, as well as other code-based data (e.g., optical character recognition (OCR) data) and the like.

In some cases, the camera device 436 may provide live image data to the display 416. In this manner, the camera device 436 may facilitate or provide a camera view to the display 416 to show live image data, still image data, video data, or any other data.

In an example embodiment, data accessed via the camera device 436 and/or the NFC transceiver (e.g., interrogator 464) may be toll free data. For purposes of illustration and not of limitation, in an instance in which the camera device 436 scans a barcode (e.g., a 2D barcode) while a user of the mobile station 105 is shopping in an entity such as Home Depot™, for example, a video of landscape lighting may be provided to the mobile station 105 without incurring data charges for the video. As another example, consider an instance in which the NFC transceiver scans a tag (e.g., a RFID tag) such as, for example, a smart poster in a mall for the newest Mission Impossible™ video trailer. In this regard, the video trailer of the movie may be provided to the mobile station 105 without incurring data charges for the video.

The mobile station 105 may also include volatile memory 422 and/or non-volatile memory 424, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory (e.g., volatile memory 422, non-volatile memory 424) may be an electronic storage device (e.g., a computer readable storage medium) comprising gates configured to store data (e.g., bits) that may be retrievable by a machine (e.g., a computing device like processing device 408). In an example embodiment, the memory may be a tangible memory that is not transitory. The memory may be configured to store instructions (e.g., software instructions, computer program code instructions) for execution by the processing device 408. In this regard, for example, the memory may store content, such as computer program code for an application and/or other computer programs.

Exemplary Network Device

Figure 4:
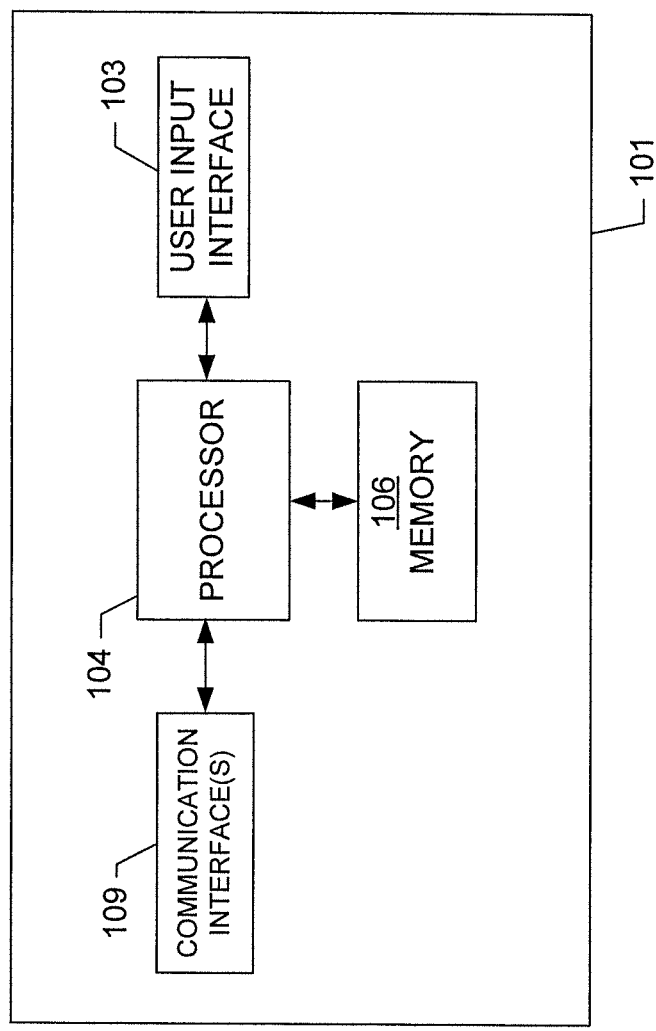
FIG. 4 is a schematic block diagram of a network device according to another example embodiment of the invention.

Referring now to FIG. 4, a block diagram of an example embodiment of a network device is provided. In an example embodiment, the content provider 115, the CDN 130 and the marketing aggregator device 135 may include the components of the network device 101. As shown in FIG. 4, the network device (e.g., a server) generally includes a processor 104 and an associated memory 106. The memory 106 may comprise volatile and/or non-volatile memory, and may store content, data and/or the like. The memory 106 may store client or server applications, instructions, and/or the like for the processor 104 to perform the various operations of the network device 101.

The processor 104 may also be connected to at least one communication interface 109 or other means for displaying, transmitting and/or receiving data, content, and/or the like. The user input interface 103 may comprise any of a number of devices allowing the network device 101 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

Service Overview

The Toll Free Data service ("TFD service") refers to a network capability wherein conventional billing for data access is modified, typically to provide free data access (or a reduced rate could be provided, instead). Many wireless carriers no longer offer unlimited data access, but rather limit the aggregate data that can be transferred during a billing cycle, or limit the aggregate data transfer based on prepaid data by users (e.g., subscribers) that is not necessarily billed on a monthly basis or otherwise provide "tiered" pricing plans based on various amounts of data transferred. This pricing structure can encourage users to limit their data usage. The TFD service allows certain instances of data to be transferred without impacting the user's billing rates of the mobile operator. For instance, the cost of the data may be included as part of the billing by the sponsor. Additionally, the TFD service may allow data to be transferred without being considered as part of the periodic accrued data transfer. Typically, the destination (a.k.a. "sponsor") pays for the data transferred in some manner. In this regard, the TFD service is similar to "800" or toll free telephone service where the destination party (not the originator) pays for the telephone call. In the TFD data service, the destination entity (a.k.a. sponsor) pays for the data access. Thus, a sponsor can "encourage" mobile users to access their web site to obtain, e.g., product information. Without this service, users may be hesitant to "consume" data usage for fear of adversely impacting their mobile phone bill.

The TFD data service may involve "campaigns," which in many cases are associated with an advertisement campaign. A "campaign" can be described (but not limited to) the collective data, time period, terms, and/or associated processing associated with providing toll free data for a particular destination for a certain time. Returning to the example of a retailer encouraging access to a particular web site, the retailer may have a promotion during which time mobile users are encouraged to access a web site dedicated to a new product/service. The promotion could be associated with an upcoming concert event, a new car model release, or an airfare sale by an airline. For obvious reasons, the retailer may desire to limit free access to a web site (since the retailer is paying for the service) for the duration of the "campaign." Thus, the TFD campaign may be linked to an advertising or product promotion campaign. Unless stated otherwise, "campaign" used by itself refers to the TFD campaign, distinct from an advertising campaign. In other embodiments, a destination could be "permanently" associated with toll free data access (e.g., there is no defined end date). In another example embodiment, a subscriber may pay a sponsor exclusively for accessing data content (e.g., data content provided by the sponsor) and the subscriber may not incur data charges from their mobile operator for this data content.

Various data must be stored, accessed, and processed during a TFD campaign. Typically, relevant data includes the beginning and ending dates. This information is typically used by the DSMP 125 that enforces the duration aspects of a TFD campaign. Because there may be multiple concurrent, but distinct campaigns underway, a campaign identifier (e.g., by a name or numerical identifier) is required, which is used to identify the set of relevant parameters for processing, by the DSMP module 97 in the DSMP 125. For example, if Ford automotive introduces a new car model for their "Edge" model car, there may be a web site operated by Ford (or by their designated agent) providing information about the car, and an associated TFD campaign, referred as herein as, e.g., the "Ford Edge campaign."

In this example, the sponsor of the TFD campaign is Ford which may maintain the web site regarding the Edge model car associated with the TFD campaign. However, in an alternative example embodiment, in an instance in which a subscriber utilizes the mobile station 105 to access a web site to obtain sponsor-related information (e.g., information about the Edge model car), the information may be provided by a CDN 130. In this regard, the CDN 130 may maintain web sites on behalf of multiple sponsors (e.g., content providers (e.g., content provider 115)) and may provide the mobile station 105 information associated with a sponsor in an instance in which the mobile station 105 accesses a corresponding web site. In this manner, sponsors may conserve resources (e.g., processing capacity, bandwidth, memory capacity, etc.) of their network devices (e.g., servers).

Once the DSMP 125 knows about a TFD campaign, it can process a data request associated with the Ford Edge campaign after the destination is indicated (e.g., usually via a uniform resource locator (URL)). The DSMP module 97 of the DSMP 125 may determine the beginning/ending dates, and process the request accordingly. Presumably, if the request occurs when the campaign is valid, the request will be processed, by the DSMP module 97, but if the request is before or after the campaign, the request may be denied by the DSMP module 97. The DSMP module 97 of the DSMP 125 may inform the mobile station 105 of the user of this error condition.

Toll Free Service Enhancement

Figure 5:
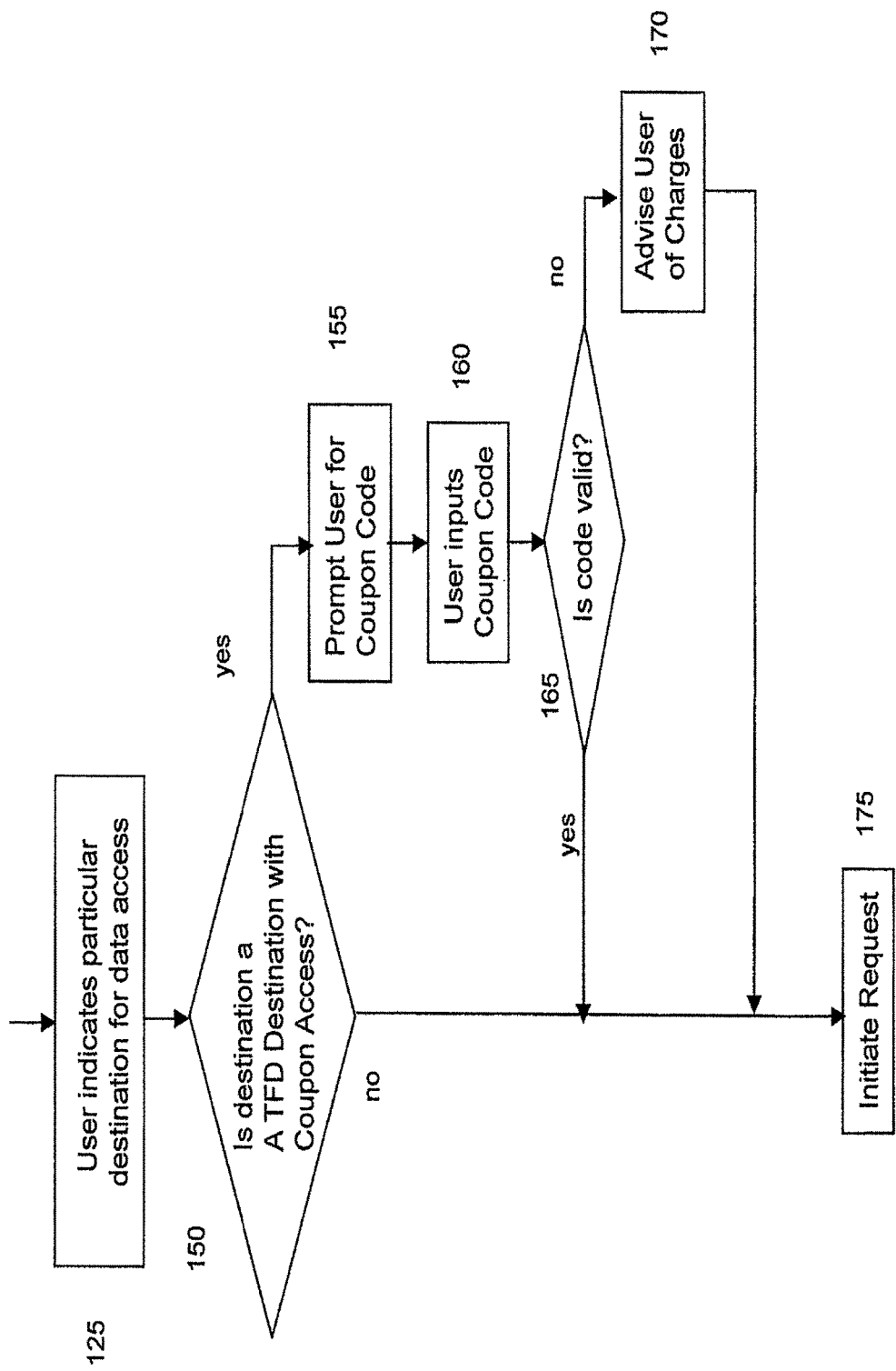
FIG. 5 is a diagram illustrating processing in a mobile station according to an example embodiment of the invention.

A service enhancement to the toll free service is described below. In FIG. 5, the user requests a particular destination request, which is processed at the DSMP 125. (See step 125) In step 150, the DSMP 125 determines whether the particular destination is a TFD destination, and further, whether is it associated with a "coupon code" (or authorization code). The coupon code may be a numerical value which allows access to the destination on a toll free basis. In step 155, the coupon code may be distributed as part of a promotion to callers allowing them toll free access to the web site provided that the appropriate coupon code is entered after prompting for such. In steps 165 and 175, if a valid code is entered, a mobile station 105 of the user accesses the destination on a toll free basis in response to initiating a request to the destination (e.g., a content provider (e.g., content provider 115)). In steps 170 and 175, if the code is not valid or not entered, the DSMP 125 may advise the user of charges and proceed, or (as not shown) the DSMP 125 may terminate the proceedings.

Problem Addressed

The above approaches presume that the user is aware of the TFD status of a destination in some manner. The user of a mobile station 105 may not be provided information before accessing the destination (e.g., the sponsor (e.g., content provider 115)) as to whether there is a TFD campaign associated with the destination. It is possible that information could be provided to the mobile station 105 of the user after accessing a web site (e.g., a notice on the web site that the sponsor is providing toll free data), but this does not provide the user with notice before they initiate the request via the mobile station 105. This is similar to expecting a user to place a long-distance call without the user knowing whether they will have to pay for the call or not. Without knowing in advance, the user may not initiate the request.

As described in U.S. patent application Ser. No. 12/970,152, an approach for informing the user that a website is being sponsored (e.g., is associated with a TFD campaign) is to inform the user via advertising, email, or Short Message Service (SMS) messaging. This approach can be effectively used in some circumstances. For example, a user exposed to an advertisement could be informed in that advertisement that further information can be provided by accessing a sponsored web site. The user may be informed of a sponsored web site by conventional advertising, email notification, SMS messaging, or other notifications over a data channel(s). However, this approach presumes that the user is notified beforehand. However, this can inundate the user with information or messages about upcoming or ending TFD campaigns. Thus, much of the advertising, emails, or SMS messages may not be received, reviewed, desired, or retained by the user.

A user may wish, instead, to rely on other approaches for informing them whether they will be charged by their wireless provider for accessing mobile data. Several various embodiments are possible.

Mobile Station Based Notification

In this embodiment, information regarding the list of TFD sites ("TFD Site Information") is downloaded to the mobile station 105. The information comprises sponsored site information, such as data in the form of destination identifiers (e.g., web site URI, URLs, etc.) Additional information may also indicate the ending dates, or other restriction/parameters associated with the sponsored site campaign.

When the processing device 408 of the mobile station 105 of the user requests to access a specific TFD site, the mobile station 105 is able to then inform the user of the toll free charging status as appropriate. For example, in one embodiment the mobile station 105 is programmed to interrupt a request for data access to inform the user that the destination is (or is not) a sponsored site. Various controls, authorization controls, or overrides can be defined for allowing the process to continue or blocking the user from incurring data charges. For example, the mobile station 105 may allow requests to TFD sites and block any requests for conventional (e.g., user charged) data access requests. Or the mobile station 105 may request an authorization code before allowing the user to access the non-TFD destination.

The user may invoke a Mobile Application (also referred to herein as Mobile App), which then initiates a request for the TFD Site Information. This request is sent by the processing device 408 of the mobile station to the DSMP 125. Since the DSMP module 97 of the DSMP 125 knows about the current campaigns (e.g., which are active, scheduled to be active, when they start/stop, etc.), the DSMP 125 is able to provide the TFD Site Information to the mobile station 105, where the processing device 408 of the mobile station 105 is able to process it in accordance with locally defined routines.

The mobile station 105 may receive the data via a number of communication techniques, including via SMS, email, or other applications of a data channel employed by the mobile station 105.

In one example embodiment, the MS Mobile Application (e.g., Mobile App) can periodically request the TFD Site Information in an instance in which the Mobile Application is executed by the processing device 408. This can occur by periodic requests for the information by the mobile station 105 (such as request an update during off-peak traffic times) or when triggered by some user action or other event. For example, each time the user activates the Mobile Application, it could check for updates. Alternatively, updates or notifications thereof could be sent to the mobile station via email, SMS, data channels, or other means. A combination of requesting new downloads by the mobile station 105, as well as receiving updates "pushed" from the DSMP 125 or other source are possible.

The DSMP 125 may provide the mobile station 105 with a subset of the TFD Site Information, or otherwise employ an algorithm for selectively providing the user with a subset of information. For example, the DSMP 125 may receive a geo-location code in the request from the mobile station 105. Thus, prior to fulfilling the request, the DSMP 125 is aware of the location of the user. In one embodiment, the DSMP module 97 of the DSMP 125 may return a selective subset of TFD Site Information for certain types of sponsored content providers associated with that location. For example, restaurants providing sponsored data in that geographical area (e.g., within a proximity of the location of the user) may be included, but restaurants in other cities or states with sponsored data may not be included.

In another application, the mobile station 105 may include an explicit user identifier, or the wireless server provider can ascertain a user identifier in the initial request, or from other data associated with the initial request. The set of TFD Site information may be determined by the user identifier. For example, an employer may subsidize an employee's access to certain web sites using the employee's mobile station 105. For example, a utility contractor where their employees use their personal smart phone may subsidized for providing free access to certain sites. When the employee's mobile station 105 initiates the request for TFD Site Information, the DSMP 125 may further include those TFD sites when fulfilling the request that otherwise would not be provided.

In one embodiment, the mobile station 105 (e.g., a smart phone) may be logically divided as two phones—a personal phone and a work phone. The employer could control or limit data access of the work phone by defining toll free sites that can be accessed when the user, as employee, uses the phone for employer's business. When used as a personal phone, the user may incur conventional data access charges.

Network Notification

In this example embodiment, a mobile station 105 of the user is provided with network notification after making an initial TFD access request, but before any TFD data is transferred, charging status is provided and the mobile station 105 asks the user whether they want to proceed. This can include requiring the user to enter user-specific authorization codes before data access is allowed.

For example, a mobile station 105 of a user can request data from a web site, and all requests are initially processed by the network provided to determine whether the site is a conventionally charged site, or a sponsored site. The mobile station 105 of the user is provided with this information, and an override code may be required, e.g., in order to access a conventional charging site.

The authorization codes could be viewed as "coupons" or promotional codes entered by the user to provide limited toll free access.

Content Provider Notification

In this embodiment, a web site is accessed in a conventional manner—e.g., in a non-sponsored manner. The mobile station 105 of the user is presented with a web site wherein a link on the web site is indicated for accessing subsequent data on a toll free basis.

For example, a web site may feature product information about an automobile (recall the Ford Edge automobile campaign). The initial access to the web site involves transferring HTTP information about various Ford products. However, the web site offers links to promotional videos about the Ford Edge automobile. Many users readily recognized that accessing video potentially involves transferring a significant amount of data, and can quickly consume a data budget. Hence, a mobile user may be hesitant to access this link on the Ford web site.

The link could be indicated in conjunction with an icon displayed on the web site that indicates that it is a sponsored link or explicitly states such. The link, in turn links to a sponsored site (e.g., a site of a content provider (e.g., content provider 115)), which is accessed as if the user initiated the request. In this manner, the mobile station 105 of the user is informed by the sponsored content provider (e.g., content provider 115) that the data transfer is associated with TFD service. Thus, it is possible to provide TFD access within a conventionally billed web site.

Search Engine Provider Notification

The mobile station 105 of the user may be informed of the TFD access status of a particular destination by accessing a search engine, or third party server. A mobile station 105 of the user could search, for example, listings of "nearby Atlanta restaurants with free on-line ordering." The search engine typically lists a series of web sites, and an icon could be placed adjacent to each entry indicating toll free data access. For example, the icon could be the letters "TFD" or some other image could be used. When the user selects the indicated toll free web site, the request is made via the processing device 408 of the mobile station 105 and access is provided according to the appropriate charging status. In this case, a geo-code (e.g., a GPS location) could be transmitted by the mobile station 105 to aid in determining which subset of TFD Site information should be returned to the user.

In another embodiment, the mobile station 105 of the user may request a list of toll free access web sites from a third party directory. This can be further limited to certain subjects, locations, services, etc. For example, the mobile station 105 of the user could request the user's wireless service provider to inform them of nearby restaurant sites with the relevant criteria.

Exemplary System Operation

Figure 6:
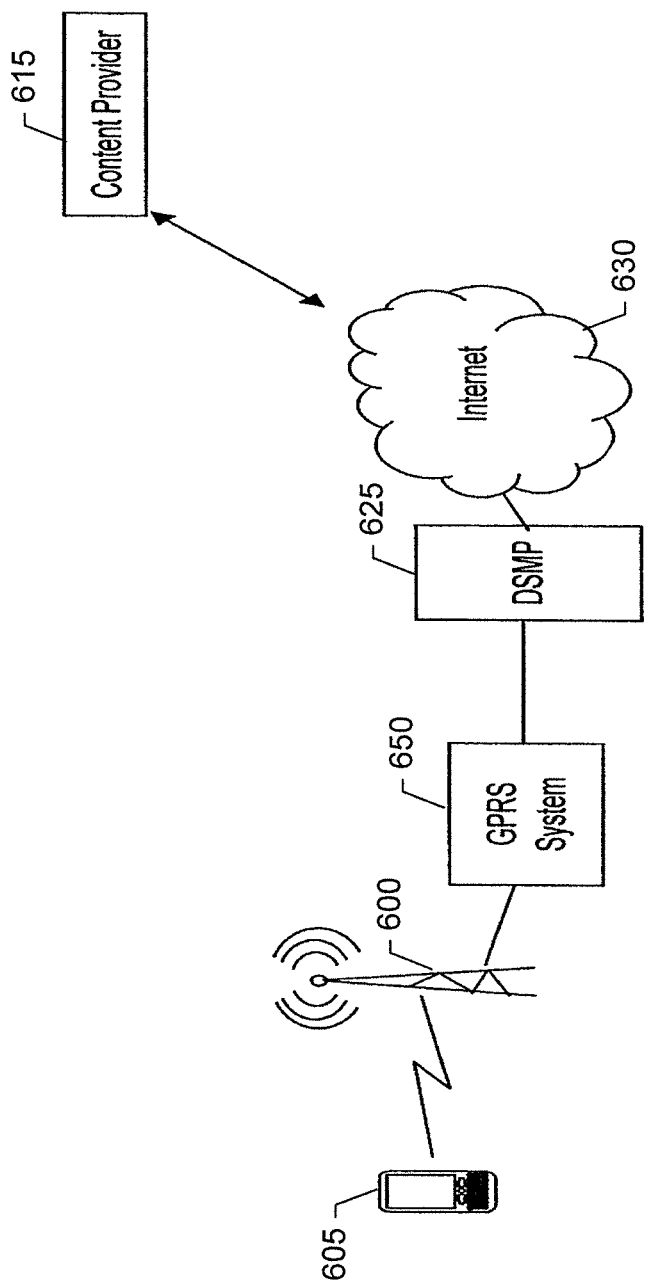
FIG. 6 is a diagram illustrating a system level example embodiment of the invention.

The system according to one alternative example embodiment for processing TFD Site Information is shown in FIG. 6, and largely involves a mobile station (MS) 605 (e.g., mobile station 105), a General Packet Radio Service (GPRS) system 650 (e.g., GPRS system 145), and a DSMP 625 (e.g., DSMP 125). The GPRS handles various functions (such as, for example, relaying of requests), which may provide a viable data service. The GPRS 650 is configured so as to not bill the user for accessing a TFD site as disclosed in U.S. patent application Ser. No. 12/970,152. In one example embodiment, the GPRS system 625 may be a mobile data network, including but not limited to, a Third-Generation (3G) network, a Fourth-Generation (4G) network, an Evolution-Data Optimized (EV-DO) network (e.g., a 1×EV-DO network), a Wireless Fidelity (e.g., Wi-Fi) network, or any other suitable mobile data network.

In summary, the MS 605 originates the request for TFD Site information, and the DSMP 625 provides such information in a response message, via the GPRS system 650 and base station 600 (e.g., BS 100). The MS 605 may augment its information with location information, user information, or other information that is used by the DSMP 625 in selecting the appropriate TFD Site information to provide to the MS 605. Once the MS 605 has the TFD Site Information, a request for accessing TFD may be made. The request may be sent by MS 605 to content provider 615 (e.g., content provider 115) via Internet 630. In response to receipt of the request, the content provider 615 may provide toll free data to the MS 605.

DSMP Processing

The DSMP 125 essentially receives a request from a mobile station 105 for TFD Site Information, and responds with the appropriate information. In various embodiments, certain parameters may be present in the request from the mobile station 105, which the DSMP module 97 of the DSMP 125 uses in selecting the TFD Site Information in the response. This may include, but is not limited to, user identification of various forms, content referral identification, and location information.

Figure 7:
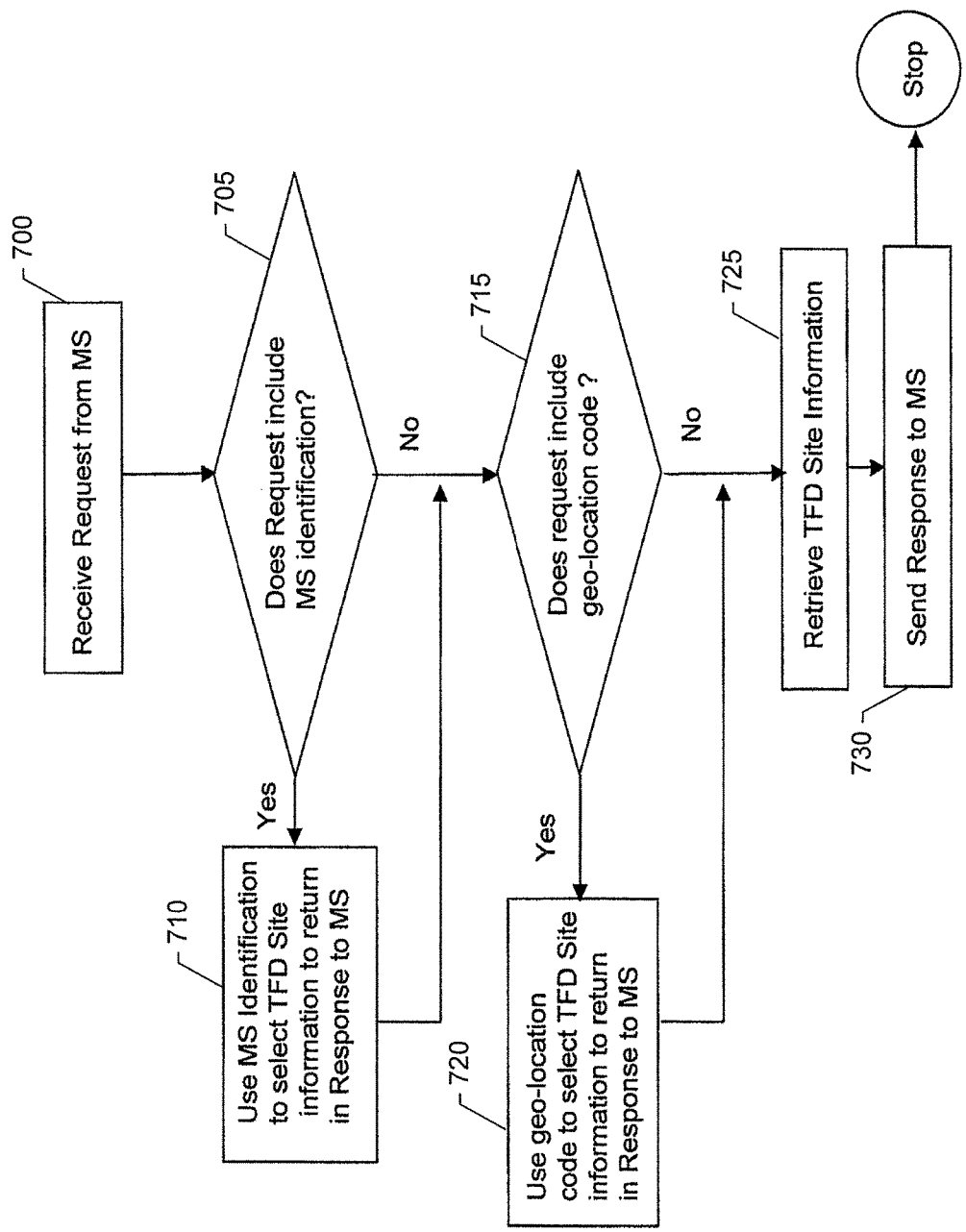
FIG. 7 is a diagram illustrating processing in a Data Session Management Platform (DSMP) according to an example embodiment of the invention.

One embodiment of the DSMP processing is shown in FIG. 7. In FIG. 7, in step 700, the DSMP 125 receives a request for data from a mobile station (MS) 105. In step 705, the DSMP 125 may determine whether the request includes a MS identification. In one example embodiment, the request typically includes at least a MS identifier (see messaging section below for various embodiments). In step 710, the DSMP 125 may use the MS identification to select TFD Site information to return to the mobile station 105 in response to determining that the request includes the MS identification. In step 715, the DSMP 125 may determine whether the request includes a geo-location code in response to determining that the request does not include a MS identification or in response to using the MS identification to select the TFD Site information to return to the mobile station 105. In step 720, the DSMP 125 may use the geo-location code to select the TFD Site information to return to the mobile station 105, in response to determining that a geo-location code is included in the request. In step 725, the DSMP 125 may retrieve TFD Site information in response to determining that the request from the mobile station does not include a geo-location code or in response to using a geo-location code to select TFD Site information to return in the response to the mobile station. In step 730, the DSMP 125 may send the response to the mobile station 105. The response may include items of TFD Site Information (e.g., a list of TFD sites). In some example embodiments, the DSMP 125 may use various information such as geo-codes, user identifiers, content referral identifiers, etc. to determine which site information to download to the mobile station 105. In this regard, only content from the main TFD site or content referred by the main TFD site may be downloaded to the mobile station 105. Content referred by the main TFD site may be indicated by a referrer identifier such as an HTTP Referrer header. In other embodiments, the DSMP 125 may restrict or otherwise selectively provide TFD Site Information.

MS Processing

Figure 8:
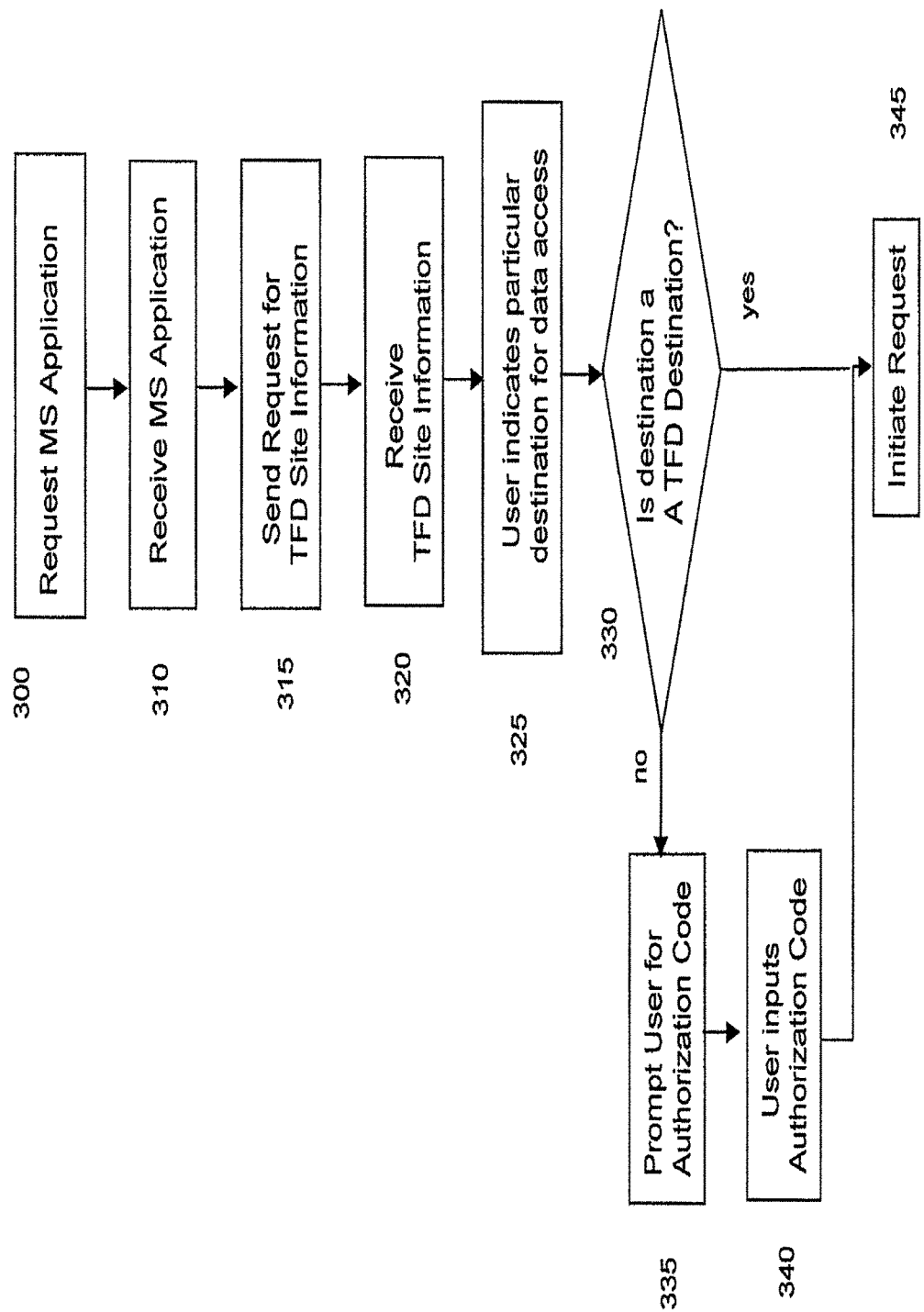
FIG. 8 is a diagram illustrating processing in a mobile station according to an example embodiment of the invention.

One embodiment of the MS processing is shown in FIG. 8. Although the processing is shown as a series of steps, the steps can be performed in groups at certain times.

First, steps 300 and 310 occur. Step 300 represents the mobile station 105 requesting a Mobile Application ("Mobile App") to be downloaded from a source of the Mobile App in step 310. In some example embodiments, the Mobile App may be installed by a mobile station manufacturer or a mobile operator, etc. The Mobile App as downloaded may initially include the list of current TFD Sites. In some embodiments, the request for the Mobile App may be directed to the DSMP 125, or to an application "store", or other server which downloads the application. The application can be downloaded with current TFD Site Information to the mobile station 105, or this can be requested later by receiving updates as previously discussed. In one example embodiment, the Mobile App may be a general purpose application utilized for interaction/communications (e.g., toll free data access) with various sponsors. In an alternative example embodiment, the Mobile App may be specific to a particular sponsor (e.g., a sponsor specific application) utilized for interactions/communications (e.g., toll free data access) with a specific sponsor.

Once downloaded, the application can subsequently request a current list of TFD Sites when triggered in step 315. The triggering can occur based on user input, a timer, or some other event as programmed into the Mobile App (e.g., upon execution by the processing device 408). In some embodiments the initial downloading will include a current list of TFD Sites so that the Mobile App does not require initiating a request to obtain a current list of TFD Sites. This can be accomplished, by the processing device 408 of the mobile station 105, by comparing the time of the last download of TFD Sites with the present time.

Step 315 assumes that the Mobile App is subsequently triggered, via processing device 408, to obtain a current list of TFD Sites. The action triggering the request may occur significantly after the Mobile App is downloaded. Further, the Mobile App can be repeatedly triggered. In Step 320, the information is received and the mobile station 105 stores this information in its memory (e.g., volatile memory 422, non-volatile memory 424). The information can comprise TFD Site destinations, expiration dates, restrictions, and/or other parameters as described herein.

In step 325, the Mobile App is used to access, via the processing device 408, a data site. This can be a TFD Site which has been provided to the mobile station 105 via the Mobile App. If, in step 330, the destination is a TFD destination, typically indicated via a URL in an HTTP based message, the Mobile App may then proceed to step 345 and initiate the request (e.g., a request for data access from the TFD destination). Since there is no charge for accessing the site, the mobile station 105 may be programmed to allow such access on an unrestricted basis. If, however at step 330, the site is not a sponsored destination, then the mobile station 105 may be programmed to request confirmation or receipt of an authorization code before proceeding. In some embodiments, the mobile station may be programmed to prompt the user as follows: "Accessing the destination may result in data charges to your account. Are you sure you want to continue (Y/N)?" In other embodiments, the user may be prompted for a PIN, password, or authorization code in step 335 in order to receive the toll free access. If the response in step 340 is sufficient to allow access, then the mobile station 105 proceeds to step 345 and initiates the request.

The mobile station can be programmed in various ways to interact with the user. For example, the mobile station could always seek confirmation from the user before accessing the destination site. The mobile station could only seek user input for sponsored sites, as opposed to non-sponsored sites.

Marketing Aggregators

In one example embodiment, a DSMP may have a relationship with a marketing aggregator. The marketing aggregator may be an entity (e.g., a marketing agency) with relationships to one or more content providers (e.g., a content provider(s) 115) (e.g., content provider A, content provider B, content provider C, up to N number of content providers). The content providers may maintain web sites for their services and products. In this example embodiment, by utilizing the relationship with the marketing aggregator, the DSMP (e.g., DSMP 125) may communicate with the marketing aggregator via the marketing aggregator device 135 to establish a relationship with one or more of the content providers (e.g., sponsors) associated with the marketing aggregator to establish toll free data service relationships.

For purposes of illustration and not of limitation, consider an example in which a DSMP (e.g., DSMP 125) has a relationship with a marketing aggregator denoted Marketing Aggregator A. In this example, presume that Marketing Aggregator A is affiliated with or has relationships with Content Provider 1, Content Provider 2, Content Provider 3 and Content Provider 4. Based on the relationship with Marketing Aggregator A, the DSMP may communicate with the marketing aggregator device 135 to contact the Content Providers indirectly or may directly communicate with devices (e.g., network devices (e.g., network device 101) of the Content Providers by sending a message(s) to these devices. The message(s) may include data requesting whether the Content Providers would like to provide toll free data service or participate in a TFD campaign for any of the products or services of the Content Providers. As described earlier, providing toll free data service may enhance interest in products or services of a content provider since some users/subscribers may not access a particular web site, for example, if they are responsible for the data charges.

In an instance in which one or more of the Content Providers 1, 2, 3 or 4 desire to provide toll free data service to users or to participate in a TFD campaign, the content providers may utilize a device (e.g., network device 101) to send a response message to the DSMP (e.g., DSMP 125) indicating the desire to provide toll free data service or to participate in a TFD campaign. In response to receipt of the message(s), from the corresponding Content Providers, the DSMP may establish a portal to enable the Content Providers (e.g., one or more of Content Providers 1, 2, 3, or 4) to provide details regarding the toll free data service or the TFD campaign, such as for example the duration (e.g., the start and end dates of the free data access) of the TFD service or TFD campaign, or any other suitable data.

As such, by utilizing the relationship with the marketing aggregator, the DSMP may establish relationships with the content providers or sponsors affiliated with the marketing aggregator to establish TFD service or TFD campaigns on behalf of these content providers.

Messaging

Figure 9:
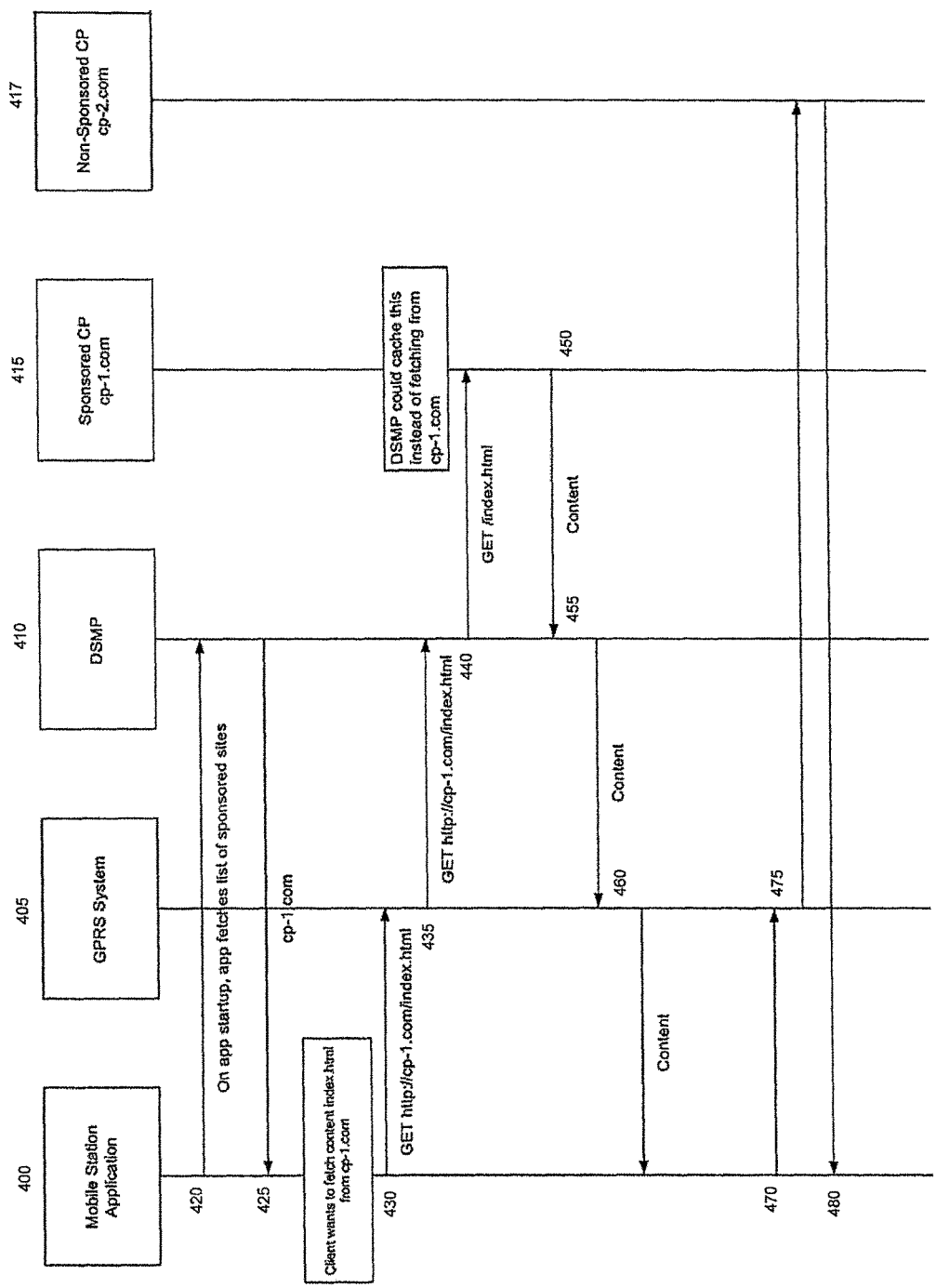
FIG. 9 is a diagram illustrating one messaging flow according to an example embodiment of the invention.

The messaging is shown in FIG. 9. In FIG. 9, the mobile station 105 comprises a MS Application 400 which communicates via the GPRS system 405 (e.g., GPRS system 145) to a DSMP 410 (e.g., DSMP 125). In this diagram, it is presumed that the user has a preexisting Mobile App or has downloaded the Mobile App 400 in a manner known in the art. The Mobile App can be loaded on the phone (e.g., mobile station 105) by the service provider or subsequently by the user. The service provider can provide an email, SMS message, or another type of notification notifying the user about the Mobile App, and providing a convenient link for requesting the Mobile APP.

The Mobile Application initiates, via the processing device 408, the communication in step 420 by requesting a list of sponsored sites. The DSMP module (e.g., DSMP module 97) of the DSMP 410 determines the appropriate list to return based on the information in the message 420. The DSMP may apply various algorithms in selecting the list of sponsored sites, and returns the list in response message 425. In this embodiment, the list of sites comprises a single site, "cp-1.com." In other embodiments, a plurality of sites will be returned in message 425. The user may be able to use the mobile station (e.g., mobile station 105) to review the list of sites.

At some subsequent point in time, the user wants to access the sponsored site. In step 430, the mobile station initiates a GET message, formatted according to the well known rules of HTTP. Other messages or formats can be used. In response, the GPRS system 405 transfers the message in step 435 to the DMSP 410. There, the DSMP 410 initiates a GET message in step 440 to the sponsored data provider 415. In one embodiment, the message is transmitted using the Internet. In some embodiments, the DSMP 410 could cache the data, and respond to the mobile station thus avoiding formulating the message in step 440.

The response comprising the content is returned from the content provider in step 450, and back to the mobile station via steps 455 and 460.

If the user desires to access non-sponsored data, the mobile station may initiate a message (e.g., a GET message) that is sent to the GPRS system 405, in step 470. The GPRS system 405 may send the message for the non-sponsored data to the non-sponsored content provider (CP) 417 in step 475. In response to receipt of the message from the GPRS system 405, the non-sponsored CP 417 may send the non-sponsored data to the mobile station in step 480.

Message/File Structure

Requesting Download of List of TFD Site Information and Response

The message structure for the Mobile App to request the list of toll free sites is in one example embodiment an HTTP or HTTPS formatted message. In another example embodiment, the Mobile App may be specific to a single content provider or sponsor. Other techniques and/or procedures or protocols are possible. For example, the above presumes the Mobile App requests the data, but in another embodiment, the Mobile App could be initiated by an email, SMS message, or other data notification requesting the source to "push" the data to the Mobile App. Further, other proprietary or standardized protocols could be used.

The request may include parameters indicating:

a. A geo-location value(s) (e.g., a geo-location code) of a location of a mobile station. This provides a coordinate of the user's location. In an example embodiment, the location module (e.g., location module 410) of a mobile station may generate the geo-location value indicating the location.

b. Profile indicator of a mobile station, or list of individual capabilities of a mobile station. This can be a model identifier or other identifier that can be used to determine a profile, via the processing device 408, of the mobile station capabilities. The profile indicator could be used to refer to a User Agent Profile, e.g., a document describing a set of capabilities associated with that mobile station. Alternatively, individual capabilities of the mobile station can be indicated. This can indicate, e.g., screen resolution, memory size, operating system type, operating system version number, etc.

c. User identifier, or employer identifier. This identifies the user or another entity which facilitates toll free access to certain sites when accessed by the user via a mobile station (e.g., mobile station 105).

d. Other parameters may also include user profile information, demographics information, parental controls, social media "likes"/"dislikes" or any other suitable parameters.

The response structure could be a series of records, where the fields comprise:

a. Destination URL—the destination address of the TFD site;

b. Ending Date—when the sponsored access ends (if at all)

c. Icon—image of sponsored content provider

Typically, the response includes at least one or more URLs, but the other fields may be optional. Other fields can be included. The response can be formatted using extensible markup language (XML) or other proprietary, standardized, or other protocols.

Requesting Access to a TFD Site

The message structure for requesting data is shown in FIG. 9, and comprises a GET message formatted as GET http://cp-1.com/index.html. The "cp-1.com" is the domain name of content provider (e.g., content provider 115). Other embodiments may include additional parameters, but these are not shown in this diagram for purposes of illustrating a basic embodiment of the invention. The request may be for the main TFD site or other resources indicated by the main TFD site. If the request is for the main TFD site, no referrer indication is necessary. If the request is not for the main TFD, but is referred by the main TFD site, a referrer indication to the main TFD site may be necessary.

File Structure

A TFD Site Information database (e.g., memory 96) stores the list of TFD sites as well as information that may provide associated attributes. For example, the database may include a TFD site, referral sites, its expiration date, a group access identifier, time of day/day of week restrictions, etc. In an example embodiment, the TFD Site Information database may, but need not, be maintained by a content provider (e.g., content provider 115). In various embodiments, varying amount of the information can be returned to the mobile station (e.g., mobile station 105). A record could comprise the following fields:

a) Destination URL
  b) Beginning/end dates of campaign
  c) List of Authorized Users
  d) Access code ("Coupon code") requirement
  e) Device specific aspects
  f) Referring URLs
  g) Number of requests allowed The information stored in the TFD Site Information database typically is a superset of the information that is downloaded to a mobile station. Typically, the information that is downloaded to the user is found in the TFD Site Information database.

When the DSMP module (e.g., DSMP module 97) of the DSMP (e.g., DSMP 125) receives a request from the mobile station (e.g., mobile station 105), the DSMP may retrieve a record based on the TFD destination and use the parameters stored in the fields of the record to determine how to fulfill the request.

Exemplary Use Case

An exemplary use case is described, which is not intended to limit the application of the principles of the present invention. The foregoing example is based on using a GSM based system, but the inventive principles are not limited to any particular wireless technology or configuration. In the described used case, a wireless GSM user operating a smart-phone (e.g., mobile station 105) downloads a list of available toll free data access web sites. In this case, the user has obtained a list of nearby pizza restaurants that offer on-line ordering in a toll-free manner.

This is accomplished by the user downloading a mobile application (e.g., Mobile App 400) from a third party service provider (e.g., content provider 115) called the "Nearby Pizza Locator." The mobile application allows the user to make a request, upon execution by a processor (e.g., processing device 408), which includes a geo-location code, for nearby pizza providers. The DSMP (e.g., DSMP 125) receives the request and performs a search function for nearby pizza parlors offering TFD on-line access. In one embodiment, the DSMP uses the location information and information about the TFD sites and provides only a list of relevant TFD sites to the mobile station (e.g., nearby pizza providers offering sponsored data). In another embodiment, the DSMP provides both TFD and non-TFD access pizza sites to the mobile station (e.g., mobile station 105).

The user may scroll or otherwise view the results (e.g., via display 416). After selecting a non-TFD site to access, the processor (e.g., processing device 408) of the mobile station may prompt the user to confirm whether the user wants to access a conventionally billed access site ("do you want to proceed or not (Y/N)?"). The user may decline, and the processor of the mobile station instead returns to presenting the user with the list of sites, and awaits a user input selection. The user selects a TFD site and the processor of the mobile station proceeds with requesting data from the site.

In this manner, the DSMP (e.g., the DSMP module 97 of the DSMP 125) provides the mobile station with TFD data which the mobile station processes in a local manner, transparent from the DSMP. The MS informs the user of the TFD status before the user accesses the site. Obviously, if the user saw an advertisement of the particular pizza purveyor indicating a toll free web site, the user would know the status before accessing the web site. However, in many situations the user is not informed by a particular advertisement, e.g., the user is not in a circumstance to view print, television, or other forms of advertising, and therefore does not know which toll free web sites to access.

The invention is not limited to the embodiments described herein. The embodiments are portrayed using the examples of a GSM based mobile station accessing a web site using a smart-phone. The principles of the invention could be applied to other architectures, technologies, access protocols, and the like. For example, the invention could be practiced by non-GSM wireless networks, using a PDA, wireless computer, tablet, or other device, as well as using proprietary or other non-standardized protocols.

Figure 10:
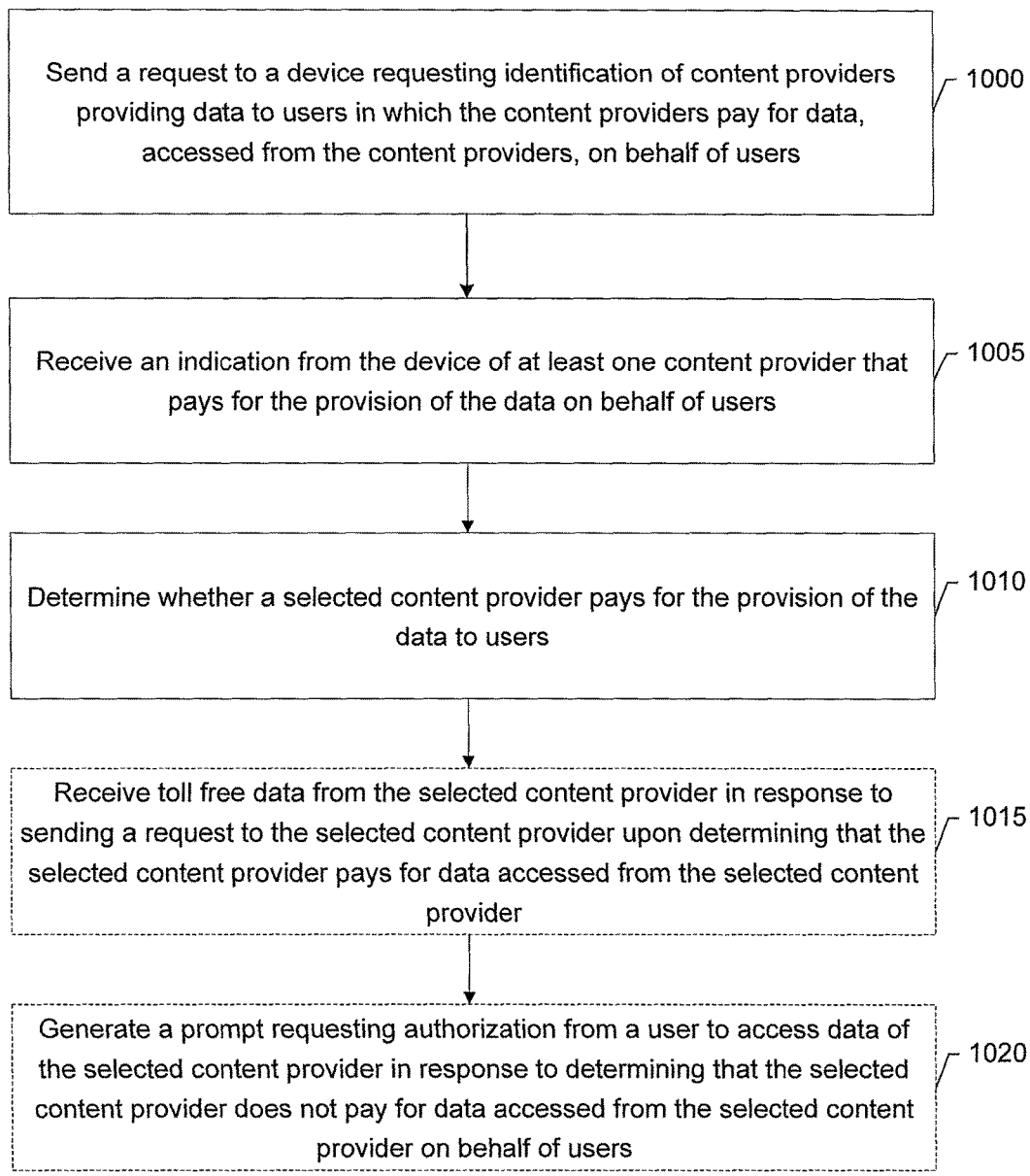
FIG. 10 is a flowchart of an example method of facilitating toll free data access according to an example embodiment of the invention.

Referring now to FIG. 10, a flowchart of an example method for facilitating toll free data access is provided according to an example embodiment. At operation 1000, an apparatus (e.g., mobile station 105) may send a request (e.g., a request for TFD site information) to a device (e.g., a DSMP 125) requesting identification of one or more content providers (e.g., a request for TFD sites maintained by content providers (e.g., a request for TFD site information)) that provide data to users in which the content providers pay for data, accessed from the content providers, on behalf of users. The accessed data is not considered data usage accrued by the users during a billing cycle (e.g., during a billing cycle of a mobile data plan with a mobile service provider). At operation 1005, an apparatus (e.g., mobile station 105) may receive an indication from the device (e.g., DSMP 125) of at least one content provider (e.g., a TFD destination site) that pays for the provision of the data on behalf of users. At operation 1010, an apparatus (e.g., mobile station 105) may determine whether a selected content provider (e.g., a destination for data access indicated by a user) pays for the provision of the data access.

Optionally, at operation 1015, an apparatus (e.g., mobile station 105) may receive toll free data from the selected content provider in response to sending a request to the selected content provider upon determining that the selected content provider pays for data accessed from the selected content provider (e.g., a sponsored site (e.g., a TFD destination site). Optionally, at operation 1020, an apparatus (e.g., mobile station 105) may generate a prompt requesting authorization (e.g., an authorization code) from a user to access data of the selected content provider in response to determining that the selected content provider (e.g., a non-sponsored destination site) does not pay for data accessed from the selected content provider on behalf of users.

It should be pointed out that FIGS. 5, 7, 8, 9 and 10 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., volatile memory 422, non-volatile memory 424, memory 96, memory 106) and executed by a processor (e.g., processing device 408, processor 94, processor 104, DSMP module 97). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 5, 7, 8, 9 and 10 above may comprise a processor (e.g., the processing device 408, the processor 94, the processor 104, the DSMP module 97) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processing device 408, the processor 94, the processor 104 (e.g., as means for performing any of the operations described above), the DSMP module 97 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
sending, via a communication device, a request to a network device requesting identification of one or more content providers that provide data to users in which the content providers pay for transmission of the data, accessed from the content providers, on behalf of users, the transmission of the data is free and is not data usage accrued by the users against a data plan of the users during a billing cycle or against a prepaid data plan of the users;
detecting, via a location detection device of the communication device, a geolocation comprising geo-coordinates of the communication device of a user;
receiving, via the communication device, an indication from the network device of at least one content provider, detected in a determined geographic area within a detected proximity of the detected geolocation of the communication device of the user, that pays for the transmission of the data, transmitted in the determined geographic area, on behalf of users in response to the network device receiving the request, in an instance in which the network device excludes one or more other content providers located outside the detected proximity, which conserves network resources, the at least one content provider is associated with visible indicia presented to a user interface of a display device of the communication device and (i) detecting user interaction with the visible indicia, by the user, and (ii) detecting a selection of the content provider, by the user from the visible indicia, via the user interface of the display device; and determining, via a processor of the communication device, whether the content provider selected from the visible indicia in response to the received indication pays for the transmission of the data, accessed from the selected content provider prior to expiration of a predefined time period, to the users such that the transmitted data from the selected content provider is free and is not data usage accrued by the data plan of the users during the billing cycle or the prepaid data plan.

2. The method of claim 1, further comprising:
generating a request for data from the selected content provider in response to determining that the selected content provider pays for data accessed from the selected content provider; and
receiving toll free data from the selected content provider in response to sending the generated request to the selected content provider.

3. The method of claim 2, wherein prior to receiving the toll free data, the method further comprises:
generating a prompt requesting an authorization code to access data from the selected content provider; and
receiving an indication of a valid authorization code in response to the prompt which enables access to the data from the selected content provider.

4. The method of claim 1, further comprising:
generating a request for data access from the selected content provider in response to receipt of the authorization; and
receiving data from the selected content provider in response to sending the generated request to the selected content provider.

5. The method of claim 1, wherein the request comprises location information indicating a location of the user and wherein the at least one content provider is identified based in part on a determination that the content provider provides free data access in the proximity of the location of the user.

6. The method of claim 1, wherein the identification comprises information requesting identifications of one or more toll free destination sites of the content providers.

7. The method of claim 6, wherein the one or more toll free destination sites comprises one or more web sites that provide data for free to devices of users during a predetermined time period.

8. The method of claim 1, wherein the network device comprises a Data Session Management Platform configured to identify content providers that pay for data, accessed from the content providers, on behalf of users.

9. The method of claim 1, wherein determining further comprises determining whether the selected content provider pays for the provision of the data to the users to indicate to the users whether the selected content provider pays for the provision of the data prior to accessing the data of the content provider.

10. The method of claim 1, wherein determining further comprises determining, in part, that the content provider selected is selected from the received indication.

11. The method of claim 1, wherein the transmission of the data accessed from the selected content provider comprises a non-Wireless Fidelity (Wi-Fi) transmission.

12. An apparatus comprising at least one processor and at least one memory including computer program code, the at least one memory and the computer program code configured to, with the processor, cause the apparatus to at least:
send a request to a network device requesting identification of one or more content providers that provide data to users in which the content providers pay for transmission of the data, accessed from the content providers, on behalf of users, the transmission of the data is free and is not data usage accrued by the users against a data plan of the users during a billing cycle or against a prepaid data plan of the users;
detect a geolocation comprising geo-coordinates of the communication device of a user;
receive an indication from the network device of at least one content provider, detected in a determined geographic area within a detected proximity of the detected geolocation of the communication device of the user, that pays for the transmission of the data, transmitted in the determined geographic area, on behalf of users in response to the network device receiving the request, in an instance in which the network device excludes one or more other content providers located outside the detected proximity, which conserves network resources, the at least one content provider is associated with visible indicia presented to a user interface of a display device of the communication device, and (i) detecting user interaction with the visible indicia, by the user, and (ii) detecting a selection of the content provider from the visible indicia, via the user interface of the display device; and
determine whether the content provider selected from the visible indicia in response to the received indication pays for the transmission of the data, accessed from the selected content provider prior to expiration of a predefined time period, to users such that the transmitted data from the selected content provider is free and is not data usage accrued by the data plan of the users during the billing cycle or the prepaid data plan.

13. The apparatus of claim 12, wherein the memory and computer program code are further configured to, with the processor, cause the apparatus to:
generate a request for data from the selected content provider in response to determining that the selected content provider pays for data accessed from the selected content provider; and
receive toll free data from the selected content provider in response to sending the generated request to the selected content provider.

14. The apparatus of claim 13, wherein prior to receive the toll free data, the memory and computer program code are further configured to, with the processor, cause the apparatus to:
generate a prompt requesting an authorization code to access data from the selected content provider; and
receive an indication of a valid authorization code in response to the prompt which enables access to the data from the selected content provider.

15. The apparatus of claim 12, wherein the memory and computer program code are further configured to, with the processor, cause the apparatus to:

generate a request for data access from the selected content provider in response to receipt of the authorization; and receive data from the selected content provider in response to sending the generated request to the selected content provider.

16. The apparatus of claim 12, wherein the request comprises location information indicating a location of the user and wherein the at least one content provider is identified based in part on a determination that the content provider provides free data access in the proximity of the location of the user.

17. The apparatus of claim 12, wherein the identification comprises information requesting identifications of one or more toll free destination sites of the content providers.

18. The apparatus of claim 17, wherein the one or more toll free destination sites comprises one or more web sites that provide data for free to devices of users during a predetermined time period.

19. The apparatus of claim 12, wherein the network device comprises a Data Session Management Platform configured to identify content providers that pay for data, accessed from the content providers, on behalf of users.

20. The apparatus of claim 12, wherein the apparatus comprises a mobile station.

21. The apparatus of claim 12, wherein the memory and computer program code are further configured to, with the processor, cause the apparatus to:

determine by determining whether the selected content provider pays for the provision of the data to the users to indicate to the users whether the selected content provider pays for the provision of the data prior to accessing the data of the content provider.

22. The apparatus of claim 12, wherein the memory and computer program code are further configured to, with the processor, cause the apparatus to:

determine by determining, in part, that the content provider selected is selected from the received indication.

23. The apparatus of claim 12, wherein the transmission of the data accessed from the selected content provider comprises a non-Wireless Fidelity (Wi-Fi) transmission.

24. A computer program product comprising at least one non-transitory computer-readable storage medium having computer-readable program code portions stored therein, the computer-readable program code portions comprising:

program code instructions configured to send, via a communication device, a request to a network device requesting identification of one or more content providers that provide data to users in which the content providers pay for transmission of the data, accessed from the content providers, on behalf of users, the transmission of the data is free and is not data usage accrued by the users against a data plan of the users during a billing cycle or against a prepaid data plan of the users;

program code instructions configured to detect a geolocation comprising geocoordinates of the communication device of a user;

program code instructions configured to cause receipt of an indication from the network device of at least one content provider, detected in a determined geographic area within a detected proximity of the detected geolocation of the communication device of the user, that pays for the transmission of the data, transmitted in the determined geographic area, on behalf of users in response to the network device receiving the request, in an instance in which the network device excludes one or more other content providers located outside the detected proximity, which conserves network resources, the at least one content provider is associated with visible indicia presented to a user interface of a display device of the communication device and (i) detecting user interaction with the visible indicia, by the user, and (ii) detecting a selection of the content provider from the visible indicia, via the user interface of the display device; and program code instructions configured to determine, via the communication device, whether the content provider selected from the visible indicia in response to the received indication pays for the transmission of the data, accessed from the selected content provider prior to expiration of a predefined time period, to the users such that the transmitted data from the selected content provider is free and is not data usage accrued by the data plan of the users during the billing cycle or the prepaid data plan.

25. The computer program product of claim 24, further comprising:

program code instructions configured to generate a request for data from the selected content provider in response to determining that the selected content provider pays for data accessed from the selected content provider; and program code instructions configured to receive toll free data from the selected content provider in response to sending the generated request to the selected content provider.

26. The computer program product of claim 25, wherein prior to receive the toll free data, the computer program product further comprises:

program code instructions configured to generate a prompt requesting an authorization code to access data from the selected content provider; and program code instructions configured to cause receipt of an indication of a valid authorization code in response to the prompt which enables access to the data from the selected content provider.

27. The computer program product of claim 24, further comprising:

program code instructions configured to generate a request for data access from the selected content provider in response to receipt of the authorization; and program code instructions configured to cause receipt of data from the selected content provider in response to sending the generated request to the selected content provider.

28. The computer program product of claim 24, further comprising:

program code instructions to determine by determining whether the selected content provider pays for the provision of the data to the users to indicate to the users whether the selected content provider pays for the provision of the data prior to accessing the data of the content provider.

29. The computer program product of claim 24, further comprising:

program code instructions to determine by determining, in part, that the content provider selected is selected from the received indication.

30. The computer program product of claim 24, wherein the transmission of the data accessed from the selected content provider comprises a non-Wireless Fidelity (Wi-Fi) transmission.

* * * * *